A. E. Burnside.
Breech-loading Fire-arm.
No. 1429. Reissued Mar. 10. 1863
Fig. 1.
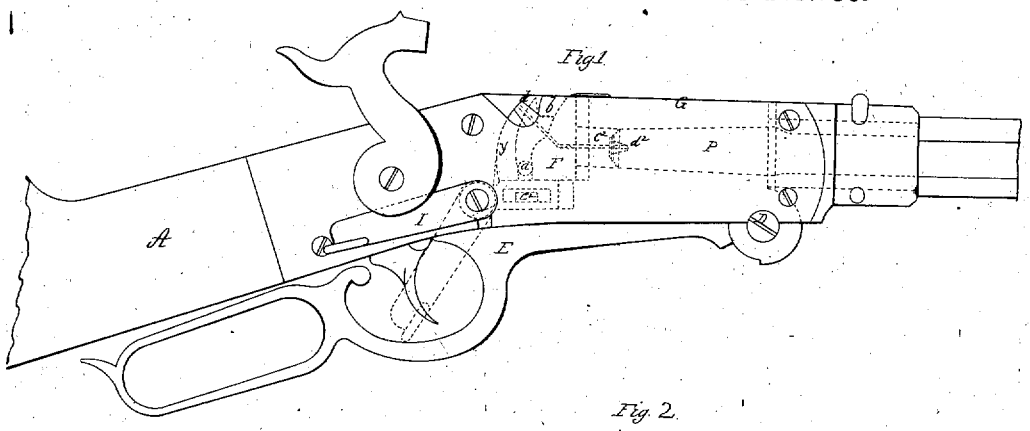
Fig. 2.
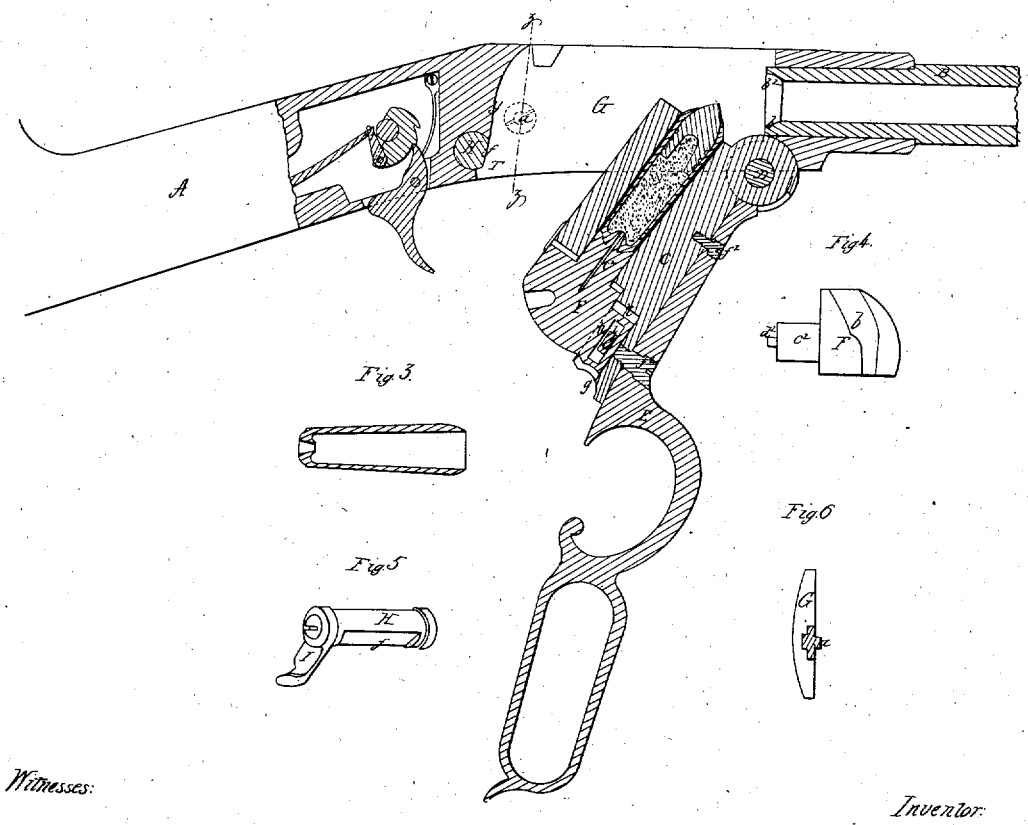
Fig. 4.
Fig. 3.
Fig. 6
Fig. 5
Witnesses:
P. A. Wilson.
E. Evans Jr.
Inventor:
Burnside Rifle Company
By A. H. Stoughton Atty

UNITED STATES PATENT OFFICE.

THE BURNSIDE RIFLE COMPANY, OF PROVIDENCE, ASSIGNEE OF AMBROSE E. BURNSIDE, OF BRISTOL, RHODE ISLAND.

IMPROVEMENT IN BREECH-LOADING FIRE-ARMS.

Specification forming part of Letters Patent No. 14,491, dated March 25, 1856; reissue No. 1,429, dated March 10, 1863.

DIVISION B.

*To all whom it may concern:*

Be it known that AMBROSE E. BURNSIDE, of Bristol, in the county of Bristol and State of Rhode Island, did invent certain new and useful Improvements in Breech-Loading Fire-Arms, of which the following is a full, clear, and exact description, reference being had to the accompanying drawings, making part of this specification, in which—

Figure 1 is a side view of a rifle with the improvements attached; Fig. 2, a longitudinal section through the same, with the movable cartridge-block swung away from the barrel; Fig. 3, a section through an empty cartridge-case; Fig. 4, view of the breech-pin detached; Fig. 5, a detached view of the bolt which locks the movable cartridge-block; Fig. 6, section on the line *z z* of Fig. 2.

The chief difficulty experienced in the construction and use of breech-loading fire-arms arises from the tendency of the discharge to open the joint between the barrel and the cartridge-block, the two being forced in contrary directions by the explosion, and, however exact the workmanship or strong the parts may be, the open joint will leak and the bearing-surfaces be fouled.

In the accompanying drawings, A is the stock, which is connected with the barrel B by a metallic breech, the sides G of which inclose the space in which the cartridge-block C operates, the top and bottom of this space being open. The cartridge-block C is of steel, and is pivoted at D, immediately beneath the end of the barrel, to the forward portion of the breech, Fig. 2, and has within it a cavity, P, or hole, open at its forward end, which forms the cartridge-chamber. The cartridge-block is arranged to be swung up to the barrel, so that the orifice of the chamber may coincide with that in the rear end of the barrel, whereby a cartridge may be employed which projects slightly from the cartridge-chamber and enters a short distance into the rear end of the barrel, and thereby packs the joint between the two by its expansion at the instant of the discharge. The cartridge-block C is attached by screws, $f^2$, to the lever E, by which it is operated, and which is formed, as seen in the drawings, to serve as guard for the trigger. When the block is swung into place, as represented in Fig. 1, its forward end abuts against the rear end of the barrel, no portion of the one sliding within or upon the other.

The cartridge which is employed is seen in section in Fig. 2, and is of a form adapted to the form of the chamber in the cartridge-block. Fig. 3 represents a section through the empty cartridge-case. As this cartridge forms the subject of another application for reissued Letters Patent made simultaneously with this, it need not here be further described.

As the cartridge-case is metallic and remains behind in the chamber after the piece is discharged, in order to facilitate its removal, the cartridge-chamber is made conical or tapering, as seen in Fig. 2. The forward end of the cartridge-block is made to abut against the rear end of the barrel, as already explained, and the joint between them is packed, and the escape of gas at this point prevented by the forward end of the cartridge, which projects a short distance from the chamber and enters the rear end of the barrel. As a portion of the ball must necessarily be of a diameter at least equal to that of the bore of the gun, and as the cartridge-case is necessarily larger than the ball, the chamber for containing the cartridge must be of greater diameter at its forward end than the bore of the gun; and in order that the expanding cartridge may pack the joint between them, the bore in the barrel is enlarged, as seen at $b^2$, Fig. 2, that the end of the cartridge may enter the barrel, and at the same time adapt itself exactly thereto when the cartridge-block is in its firing position. This enlargement of the bore at the rear end of the barrel also allows the projecting end of the ball to be swung into the barrel in the arc of a circle without striking or interfering with the barrel itself. It is also necessary that the cartridge be formed with an enlargement near to its forward end, that it may be adapted perfectly to the enlarged end of the barrel, the enlargement of the cartridge being for the purpose of filling the necessary enlargement of the barrel.

It is manifest that the cartridge-case will be driven so forcibly into its conical chamber by the force of the discharge that means will be necessary to aid in ejecting it, or to loosen it, so that it may be withdrawn by hand. For this purpose the movable cone-seat or breech-pin F is employed, which is constructed and applied as follows: The rear portion of the pin forms a continuation of the movable cartridge-block. Forward of this projects the cylindrical portion $c^2$, which enters the block C and forms the bottom of the cartridge-chamber, a cone, $d^2$, upon the forward end of the pin entering a depression in the end of the cartridge, in the center of which is a small hole, through which the fire from the cap upon the nipple *d* is communicated to the powder in the cartridge.

The passage from the nipple *d* to the cone $d^2$ is seen dotted in Fig. 1. The breech-pin F is attached to the movable cartridge-block by the following means: The center portion of the breech-pin projects down at *h* into a mortise, *k*, in the block C, and transversely through the projection *h* is a mortise, *i*. Directly opposite the mortise *i*, and entirely through the block, is a smaller mortise, into which is driven a rectangular pin or bolt, $e^2$, which fits tightly in the mortise in the block, but loosely in the mortise *i*, so that the pin F is allowed to slide freely in and out of the cartridge-chamber within a certain limit, but is prevented from dropping out when the cartridge-block is swung away from the barrel. When the cartridge is in the chamber and the block is in place, the breech-pin is forced back, and when the cartridge-block is withdrawn, as in Fig. 2, the breech-pin is thrown forward for the purpose of loosening the empty cartridge-case. This may be accomplished by the following means: In one side of the breech-pin there is a groove, *b*, in which plays a pin, *a*, projecting from one side of the breech. (Seen in section in Fig. 6.) The pin plays loosely in the groove, which is so formed that when the chamber is returned to its place the breech-pin is drawn back to its greatest distance, as seen dotted in Fig. 1. In this position the nipple *d* is brought immediately beneath the hammer, and is ready to receive its blow. As the chamber is withdrawn the breech-pin is advanced farther into it, as seen in Fig. 2, by the pin *a*, and the cartridge-case is loosened and may be easily withdrawn by hand.

In order that the cartridge-block may not be thrown out of its position by the force of the discharge, the rear of the movable breech-pin is curved from a center within the axis of the barrel, and is made to bear upon a seat, a small portion of which is correspondingly curved a short distance above and below the prolongation of the axis of the barrel. This forms, as it were, a projection within the path of the breech-pin as it descends, by which it is thrown forward, and when the gun is discharged the force of the explosion tends to retain the cartridge-block in its firing position, for it is manifest that the force which withdraws the block must at the same time advance the breech-pin, and this advance of the breech-pin cannot be produced by the force of the discharge, which tends to force it in the opposite direction. This construction also serves to throw the breech-pin forward and loosen the cartridge-case, and under some circumstances might be sufficient to retain the cartridge-block in its firing position; but as we may want to place the projecting surface of the breech lower down, as at T, and also for additional security, said BURNSIDE adopted the following device for the purpose of more unfailingly accomplishing this end.

H is a bolt which passes transversely through the breech immediately in the rear of the movable cartridge-block. This bolt is cylindrical, and is cut away upon one side, *f*, to enable the cartridge-block to be returned to its place. The bolt is then revolved by the thumb-piece or handle I, by which means its cylindrical portion is caused to enter a corresponding cavity, *g*, in the cartridge-block, which is thus held securely in place. In order that the piece may not be discharged until the bolt H has been turned into the cavity *g*, the handle I is caused to be over the guard, as seen in red in Fig. 1, and obstruct the entrance of the finger to the trigger whenever the cartridge-block is in place and not secured by its bolt.

The two methods of throwing forward the breech-pin, when the cartridge-block is withdrawn, which are represented and described above—viz., by means of the pin *a*, with its slot *b*, and the projection *y* in the rear of the breech-pin—will obviously not be required upon the same gun, either of them being sufficient for the purpose. The latter, however, (the projection *y*,) is the simpler of the two, and will in the majority of cases be preferred.

Operation: The parts being in the position represented in Fig. 2, the metallic cartridge is dropped into the chamber, which is returned to its firing position by the operating-lever E and bolted by bringing up the handle I. The joint between the barrel and the cartridge-block is thus covered by the enlargement upon the metallic cartridge-case, while the expansion of the extreme forward end or mouth of the cartridge-case effectually prevents the passage of smoke through the joint and keeps the parts untarnished. After the gun is discharged, the cartridge-block is withdrawn, and the movable breech-pin is caused to advance by the pin *a* or the projection *y* into the position seen in Fig. 2, and thus the empty cartridge-case is loosened from its chamber, so that it may easily be withdrawn by hand, if it be desired to save them, to be again employed in a similar manner. When the firing is rapid, as in action, the gun may be turned over after the cartridge-block has been withdrawn, when the empty case will fall out, and may be instantly replaced by a new one.

It is evident that the above-described principle may be employed in the construction of breech-loading cannon or to fire-arms of any other character or description.

What I claim as the invention of the said AMBROSE E. BURNSIDE, and desire to secure by Letters Patent, is—

1. The movable cartridge-block, so arranged that it may be brought up to abut against the end of the gun-barrel, with the orifice of its chamber coincident with that in the rear of the barrel, and carried away from the barrel for the purpose of loading, substantially as set forth.

2. In combination with the movable cartridge-block abutting against the end of the barrel, enlarging the ends of the barrel, and the cartridge-chamber, as described, for the purpose set forth.

3. The conical cartridge-chamber, operating as set forth, for the purpose described.

4. The sliding breech-pin, operating as set forth, for the purpose described.

5. The projection in the rear of the breech-pin for the purpose of starting the pin forward as the cartridge-block is withdrawn.

ISAAC HARTSHORN,
*President of the Burnside Rifle Co.*

In presence of—
WM. PRATT,
HENRY MARTIN.